(12) United States Patent
Taga et al.

(10) Patent No.: US 12,374,919 B2
(45) Date of Patent: Jul. 29, 2025

(54) ELECTRIC POWER SUPPLY SYSTEM AND SWITCHING ELECTRIC POWER SOURCE APPARATUS

(71) Applicant: Asahi Kasei Microdevices Corporation, Tokyo (JP)

(72) Inventors: Shiro Taga, Tokyo (JP); Makoto Kobayashi, Tokyo (JP); Teppei Hayashi, Tokyo (JP)

(73) Assignee: Asahi Kasei Microdevices Corporation, Tokyo (JP)

(*) Notice: Subject to any disclaimer, the term of this patent is extended or adjusted under 35 U.S.C. 154(b) by 89 days.

(21) Appl. No.: 18/398,136

(22) Filed: Dec. 27, 2023

(65) Prior Publication Data

US 2024/0275204 A1    Aug. 15, 2024

(30) Foreign Application Priority Data

Feb. 13, 2023  (JP) ................................. 2023-019791
Nov. 21, 2023  (JP) ................................. 2023-197125

(51) Int. Cl.
*H02J 50/00* (2016.01)
*H02M 3/06* (2006.01)
*H02M 3/156* (2006.01)

(52) U.S. Cl.
CPC ............. *H02J 50/001* (2020.01); *H02M 3/06* (2013.01); *H02M 3/156* (2013.01)

(58) Field of Classification Search
CPC .......... H02J 50/001; H02J 50/00; H02M 3/06; H02M 3/156; H02M 1/007

USPC ........................................................... 307/45
See application file for complete search history.

(56) References Cited

U.S. PATENT DOCUMENTS

| | | | |
|---|---|---|---|
| 2016/0359409 A1 | 12/2016 | Theoduloz | |
| 2019/0199216 A1* | 6/2019 | Hayashi | ............. H02M 3/1582 |
| 2020/0321862 A1 | 10/2020 | Bose | |

FOREIGN PATENT DOCUMENTS

JP        2022104383 A    7/2022

* cited by examiner

*Primary Examiner* — Rexford N Barnie
*Assistant Examiner* — Xuan Ly

(57) ABSTRACT

Provided is an electric power supply system comprising: an energy harvesting electric power source; and a switching electric power source apparatus which boosts an input voltage supplied from the energy harvesting electric power source for an output, where the switching electric power source apparatus has: an input terminal; an output terminal; a coil; a first switch; a diode; a capacitor; a voltage conversion unit which outputs a converted voltage that is based on the input voltage; and a switch control circuit which outputs a signal having a frequency corresponding to the converted voltage and driving the first switch, where the voltage conversion unit converts the input voltage such that an output impedance of the energy harvesting electric power source and an input impedance of the switching electric power source apparatus have closer values than in a case where the input voltage is inputted to the switch control circuit.

19 Claims, 16 Drawing Sheets

ELECTRIC POWER SUPPLY SYSTEM AND SWITCHING ELECTRIC POWER SOURCE APPARATUS

The contents of the following patent application(s) are incorporated herein by reference:
NO. 2023-019791 filed in JP on Feb. 13, 2023
NO. 2023-197125 filed in JP on Nov. 21, 2023

BACKGROUND

1. Technical Field

The present invention relates to an electric power supply system and a switching electric power source apparatus.

2. Related Art

A boosting switching electric power source apparatus has been known so far (see Patent Document 1, for example).

PRIOR ART DOCUMENTS

Patent Document

Patent Document 1: Japanese Patent Application Publication No. 2019-115189

DESCRIPTION OF EXEMPLARY EMBODIMENTS

Figure 1:
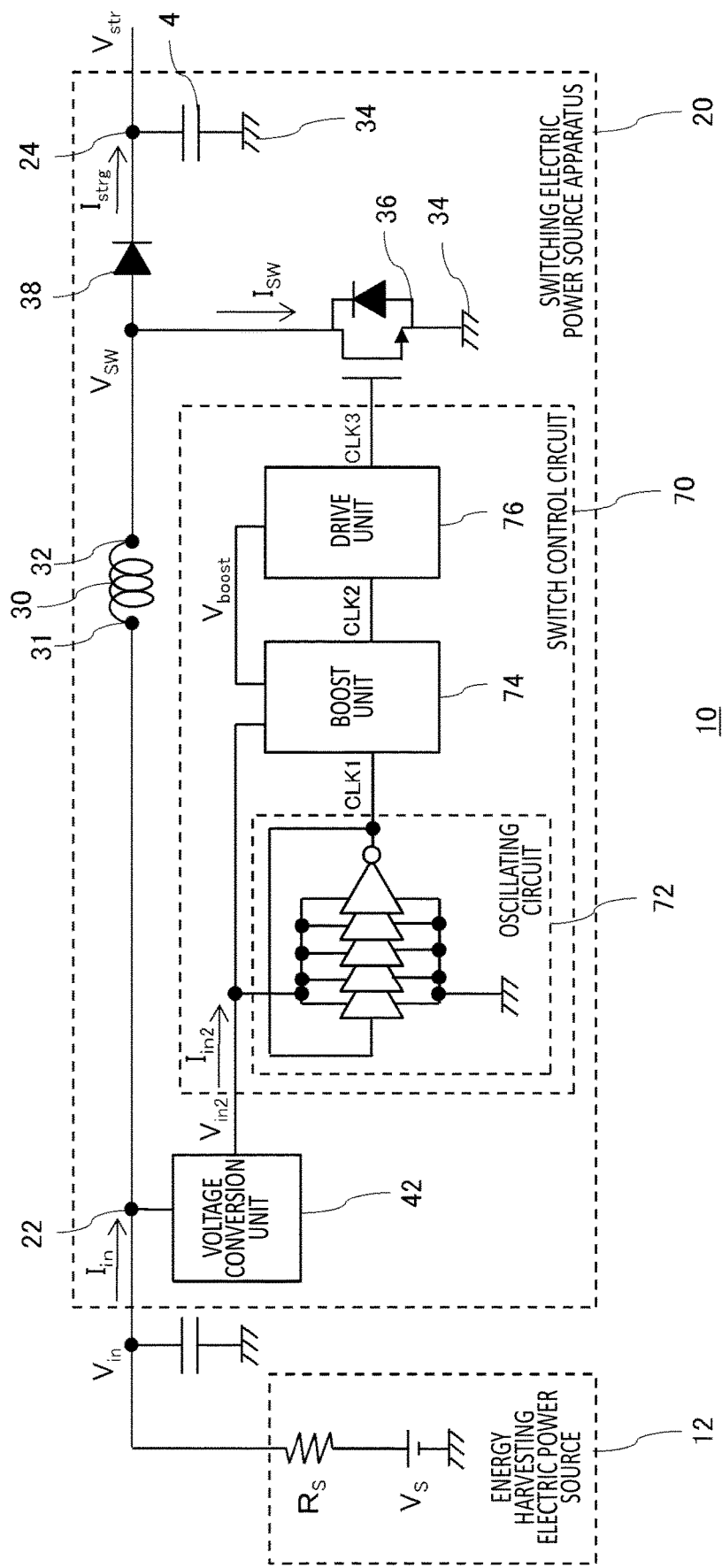
FIG. 1 shows an electric power supply system 10 according to a first embodiment example of the present invention.

Hereinafter, the present invention will be described through embodiments of the invention, but the following embodiments do not limit the invention according to claims. In addition, not all combinations of features described in the embodiments are essential to a solution of the invention. In the present specification, the same parts in each figure are marked with the same reference numerals, and their description may be omitted. In addition, some configurations may not be illustrated for illustration purpose.

In the present specification, a case where a term such as "same" or "equal" is mentioned may also include a case where there is an error due to a variation in manufacturing or the like. The error is, for example, within 10%.

An amount of electric power obtained through energy harvesting is generally small, amounts of a voltage and an electric current which can be extracted are small, and also a temporal change in the electric power is significant due to a change in its environment. A boost IC is used to collect such a small amount of electric power for charge into a capacitor or a secondary battery to a voltage which allows a sensor, a microcomputer, a BLE, or the like to operate.

FIG. 1 shows an electric power supply system 10 according to a first embodiment example of the present invention. The electric power supply system 10 includes an energy harvesting electric power source 12 and a switching electric power source apparatus 20. The switching electric power source apparatus 20 boosts an input voltage Vin supplied from the energy harvesting electric power source 12 for an output. The switching electric power source apparatus 20 is, for example, a boosting DC/DC converter.

The energy harvesting electric power source 12 is an electric power source in which an output impedance of an electric power source for, for example: photovoltaics using light energy such as sunlight, incandescent lamps, fluorescent lamps, or LEDs as an energy source; thermoelectric power generation using thermal energy such as heat generated by machines or environmental temperature as an energy source; vibration power generation using vibrations generated by machines or vibrations of bridges, roads, or the like as an energy source; electromagnetic wave power generation using electromagnetic waves, radio waves, or the like as energy; bioelectrogenesis, which is represented by a microbial fuel cell, converting an amount of biological activity to energy; or the like, works to limit the supply of electric power to a load. In order to extract more electric power from such an electric power source, it is preferable to bring an input impedance of the switching electric power source apparatus 20 coupled to the electric power source closer to an output impedance of the electric power source.

The switching electric power source apparatus 20 has: an input terminal 22 to which an input voltage Vin is applied; an output terminal 24 from which a boosted voltage is outputted; a coil 30 having a first terminal 31 and a second terminal 32, where the first terminal 31 is coupled to the input terminal 22; a first switch 36 arranged between a second terminal 32 of the coil 30 and a ground terminal 34; a diode 38 arranged in a forward direction from the second terminal 32 toward the output terminal 24; a capacitor 40 arranged between the output terminal 24 and a ground terminal 34; a voltage conversion unit 42 which outputs a converted voltage Vin2 that is based on the input voltage Vin; and a switch control circuit 70 to which the converted voltage Vin2 outputted from the voltage conversion unit 42 is inputted and which outputs a drive signal having a frequency corresponding to the converted voltage Vin2 and driving the first switch 36. One end of the first switch 36 may be coupled to the second terminal 32 of the coil 30. Another end of the first switch 36 may be coupled to the ground terminal 34. An anode terminal of the diode 38 may be coupled to the second terminal 32. A cathode terminal of the diode 38 may be coupled to the output terminal 24. One end of the capacitor 40 may be coupled to the output terminal 24. Another end of the capacitor 40 may be coupled to the ground terminal 34. Respective terminals and components may be coupled by using wiring lines or the like. Respective ground terminals 34 may be common or different.

The first switch 36 may be, for example, an nMOSFET in which an on/off state is controlled by a drive signal. In the present specification, a MOSFET may be simply referred to as a MOS. When the first switch 36 is turned on by the drive signal, an electric current flows from the input terminal 22 to the ground terminal 34 via the coil 30 and the first switch 36, and energy is stored in the coil 30. When the first switch 36 is turned off, the energy stored in the coil 30 is charged in the capacitor 40 via the diode 38, and an output voltage Vstrg increases.

The switch control circuit 70 includes: an oscillating circuit 72 in which an oscillating frequency increases as the converted voltage Vin2 increases; a boost unit 74 which boosts an oscillation signal CLK1 outputted by the oscillating circuit 72 and the converted voltage Vin2; and a drive unit 76 which generates a drive signal CLK3 driving the first switch 36. The drive unit 76 controls a switching operation of the first switch 36 by using the drive signal CLK3.

The oscillating circuit 72 is, for example, a ring oscillator, in which n (odd number of) inverters are coupled in series and an output of a final stage inverter is coupled to an input of a first stage inverter, and outputs the oscillation signal CLK1. A frequency of the oscillation signal CLK1 changes depending on the inputted voltage Vin2. Amplitude (a crest value) of the oscillation signal CLK1 is the converted voltage Vin2.

Figure 2:
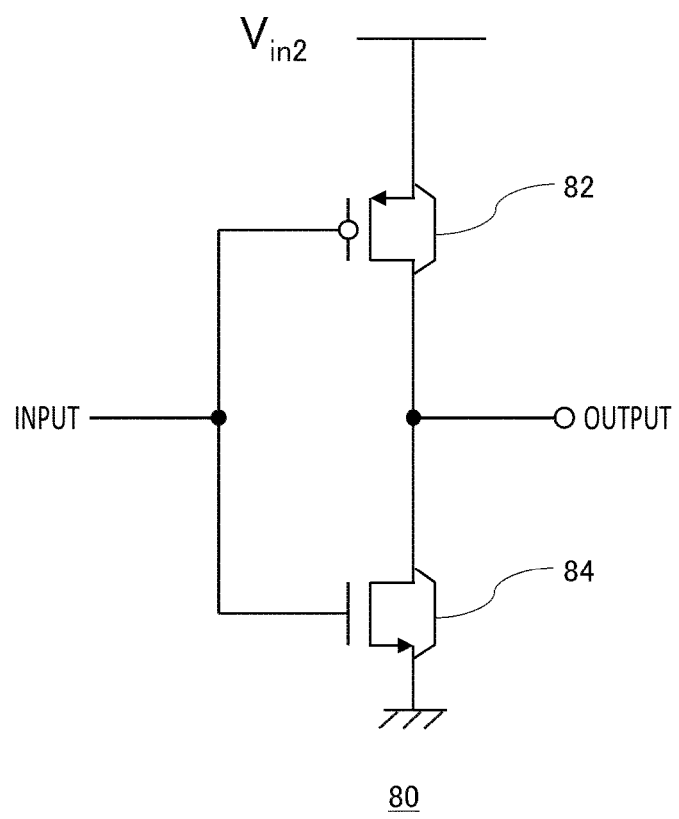
FIG. 2 shows a configuration example of an inverter 80 provided in a ring oscillator of an oscillating circuit 72 in FIG. 1.

FIG. 2 shows a configuration example of an inverter 80 provided in a ring oscillator of the oscillating circuit 72 in FIG. 1. The inverter 80 has a pMOS switch 82 and an nMOS switch 84, and a signal inputted to the inverter 80 is inputted to gate terminals of the pMOS switch 82 and the nMOS switch 84. The input voltage Vin2 is inputted to a source terminal of the pMOS switch 82, a ground terminal is coupled to a source terminal of the nMOS switch 84, a drain of the pMOS switch 82 and a drain of the nMOS switch 84 are coupled to an output, to output a voltage according to an input signal. The ring oscillator is a voltage controlled oscillator which uses the converted voltage Vin2 as a control voltage, and the oscillating frequency increases as the converted voltage Vin2 increases.

Figure 3:
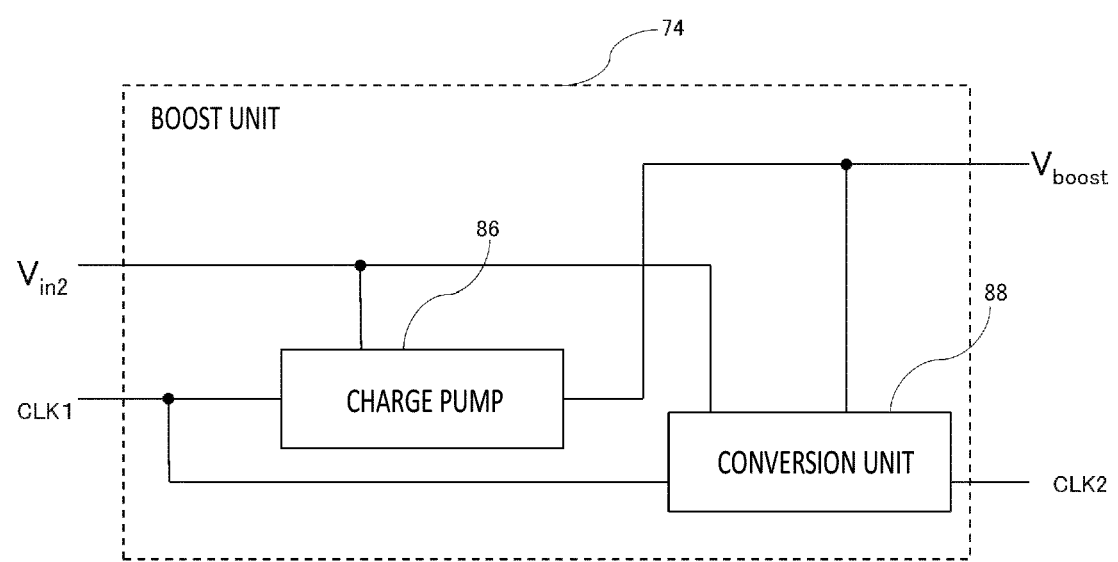
FIG. 3 shows a configuration example of a boost unit 74 in FIG. 1.

FIG. 3 shows a configuration example of the boost unit 74 in FIG. 1. The boost unit 74 may have a two-input and two-output configuration in which the oscillation signal CLK1 and the input voltage Vin2 are inputted and a signal CLK2 with amplitude of a boosted voltage Vboost and the boosted voltage Vboost are outputted. The boost unit 74 has a charge pump 86 and a conversion unit 88. The charge pump 86 boosts the input voltage Vin2 to the voltage Vboost. The conversion unit 88 outputs the signal CLK2 obtained by converting the amplitude Vin2 of the inputted oscillation signal CLK1 to the voltage Vboost.

Figure 4:
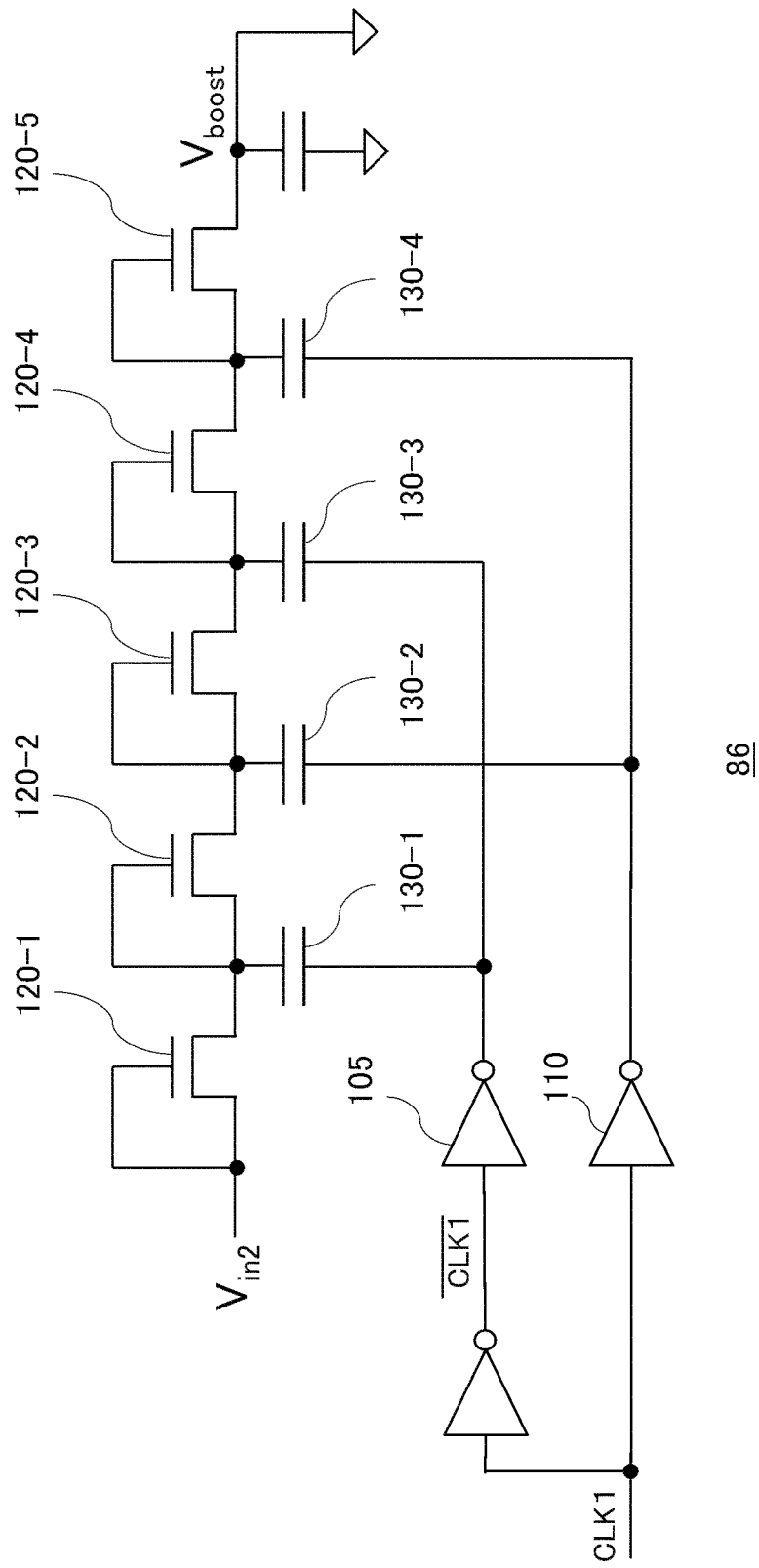
FIG. 4 shows a configuration example of a charge pump 86 in FIG. 3.

FIG. 4 shows a configuration example of the charge pump 86 in FIG. 3. In the charge pump 86, electric charges flow into capacitors for boosting 130-1 to 130-4 via nMOS switches 120-1 to 120-5 in response to complementary signals CLK1 and –CLK1 inputted to an inverter 105 and an inverter 110, and the charge pump 86 boosts each node between the nMOS switches 120-1 to 120-5, and outputs the voltage Vboost having a voltage value equivalent to x times the input voltage Vin2. For example, when there are only three stages of nMOS switches 120-1 to 120-3, the boosted voltage Vboost is 3×Vin2, and when there are five stages as in FIG. 4, the boosted voltage Vboost is 5×Vin2.

Figure 5:
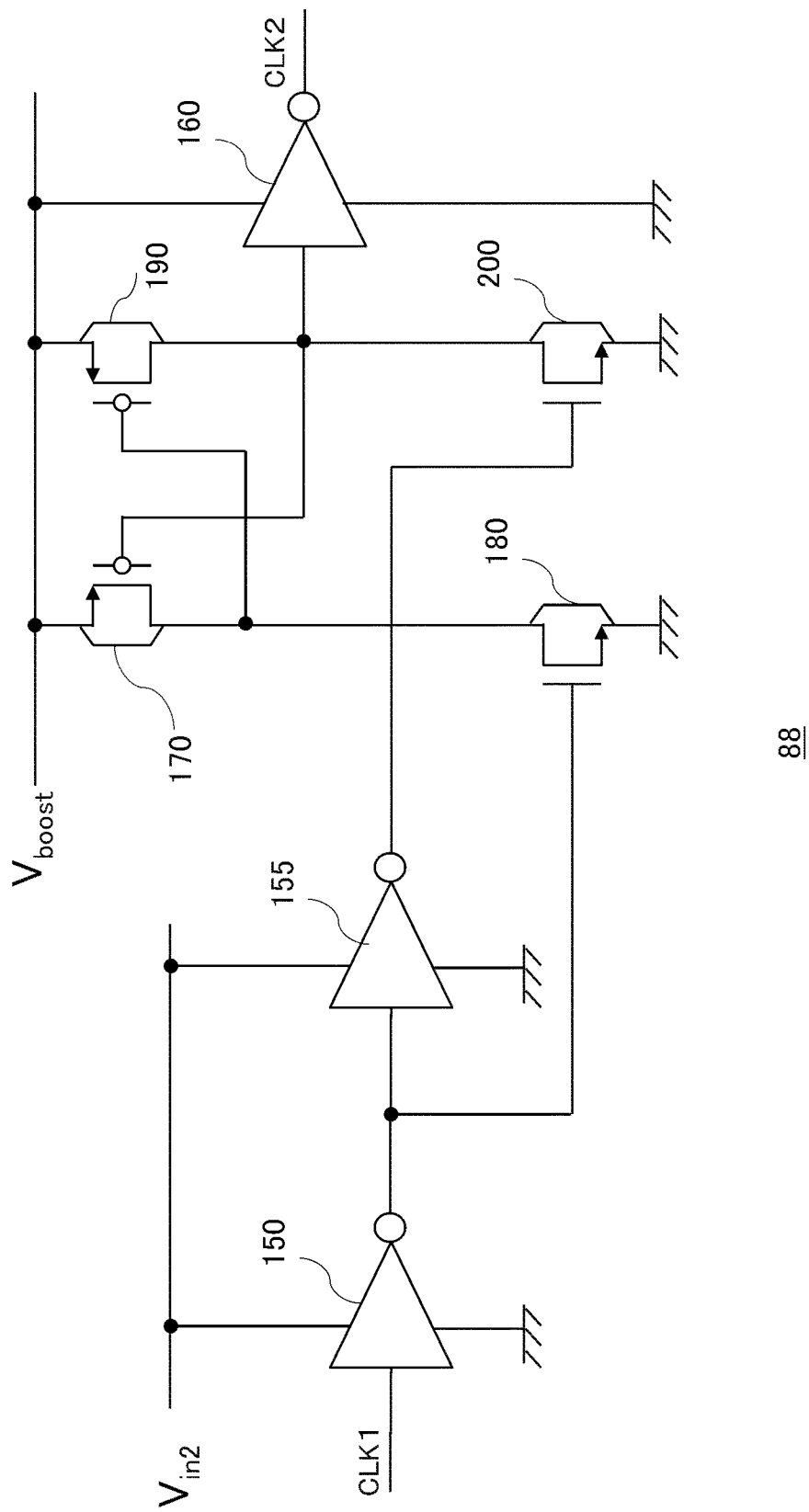
FIG. 5 shows a configuration example of a conversion unit 88 in FIG. 3.

FIG. 5 shows a configuration example of the conversion unit 88 in FIG. 3. The conversion unit 88 has: a plurality of inverters including an inverter 150, an inverter 155, and an inverter 160; and a plurality of MOS switches including a MOS switch 170, a MOS switch 180, a MOS switch 190, and a MOS switch 200. The oscillation signal CLK1, the converted voltage Vin2, and the voltage Vboost from the charge pump 86 are inputted to the conversion unit 88, and the conversion unit 88 outputs the signal CLK2 obtained by converting the amplitude from the converted voltage Vin2 to the boosted voltage Vboost. It should be noted that the inverter 150, the inverter 155, and the inverter 160 may be similar to that shown in FIG. 2.

Figure 6:
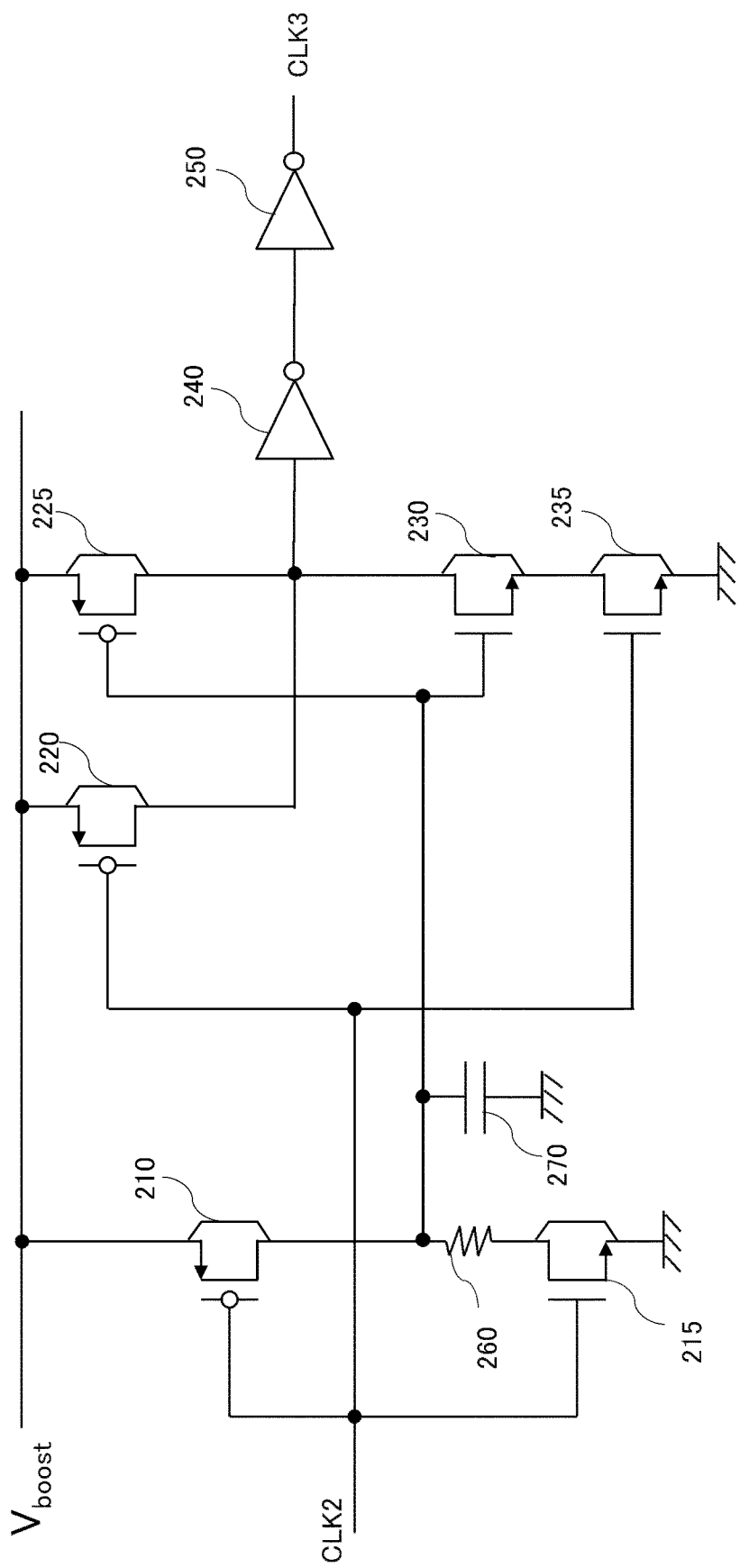
FIG. 6 shows a configuration example of a drive unit 76 in FIG. 1.

FIG. 6 shows a configuration example of the drive unit 76 in FIG. 1. The drive unit 76 outputs a signal with a fixed high-side pulse width independent of the converted voltage Vin2, in comparison with the signal CLK2 boosted by the boost unit 74. The drive unit 76 has: a plurality of MOS switches including a MOS switch 210, a MOS switch 215, a MOS switch 220, a MOS switch 225, a MOS switch 230, and a MOS switch 235; a plurality of inverters including an inverter 240 and an inverter 250; a resistor 260; and a capacitor 270. The boosted voltage Vboost and the signal CLK2 are inputted to the drive unit 76, and the drive unit 76 may output a signal with a fixed pulse width dependent on a ratio between a resistance value R of the resistor 260 and a capacitance C of the capacitor 270 (for example, a time constant τ of R×C based on a rise of the signal) as the drive signal CLK3.

Figure 7:
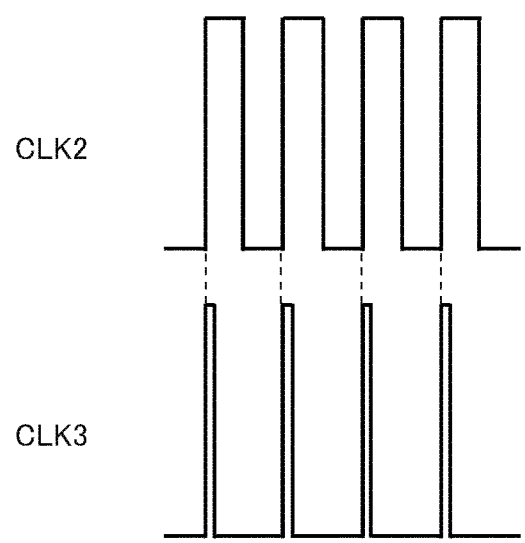
FIG. 7 shows a relationship between a signal CLK2 and a drive signal CLK3 outputted by the drive unit 76.

FIG. 7 shows a relationship between the signal CLK2 and the drive signal CLK3 outputted by the drive unit 76. The signal CLK2 has a pulse width depending on the converted voltage Vin2 during an oscillating operation in the oscillating circuit 72. On the other hand, a pulse width of the drive signal CLK3 is changed from the pulse width depending on the converted voltage Vin2 to the fixed pulse width in the drive unit 76. The drive signal CLK3 in the present example has the same cycle as that of the signal CLK2. A rise timing of the drive signal CLK3 may be the same as that of the signal CLK2. The pulse width of the drive signal CLK3 may be smaller than the pulse width of the signal CLK2.

When the converted voltage Vin2 is small, a switching frequency, which is the frequency of the oscillation signal CLK1 of the oscillating circuit 72, decreases, and thus the number of times that the first switch 36 is turned on per unit time decreases. As a result, it is possible to suppress a decrease in the input voltage Vin without drawing an excessive electric current from the input terminal 22. Accordingly, a voltage can be boosted even in energy harvesting of a small amount of electric power. In addition, unlike a general boost IC, a consumed electric current of the switch control circuit 70 is not drawn from the output Vstrg, and thus even if the input voltage Vin decreases, little electric power charged in the capacitor 40 is consumed.

Here, assuming that an inductance of the coil is L, the fixed pulse width of the drive signal CLK3 is Ton, and a frequency of the drive signal CLK3 is fosc, an average electric current Isw flowing from the input terminal 22 to the first switch 36 via the coil 30 is expressed by the following expression.

(Expression 1)
$$Isw = \frac{Vin \times Ton^2 \times fosc}{2 \times L} \quad (1)$$

On the other hand, an average electric current Istrg outputted via the diode 38 is expressed by the following expression.

(Expression 2)
$$Istrg = \frac{Vin \times Isw}{Vstrg} \quad (2)$$

A sum of Expression 1 and Expression 2 (Isw+Istrg) can be considered to be an input electric current Iin, but under a condition of Vin<<Vstrg, the input electric current Iin is as shown in the following expression.

(Expression 3)
$$Iin \approx Isw \quad (3)$$

Accordingly, when the pulse width of the drive signal CLK3 is fixed, an input impedance Rin of the switching electric power source apparatus 20 can be approximated by the following expression.

(Expression 4)
$$Rin \approx \frac{Vin}{Isw} \propto \frac{1}{fosc} \quad (4)$$

According to Expression 4, the input impedance is inversely proportional to a drive signal frequency of the first switch 36. The drive signal frequency is the oscillating frequency of the ring oscillator, which is the oscillating circuit 72, and the oscillating frequency is dependent on the converted voltage Vin2, and that is, the input impedance can be controlled by the voltage conversion unit 42 appropriately controlling the converted voltage Vin2.

The voltage conversion unit 42 may be a passive circuit or an active circuit composed of a resistor, a diode, a transistor, and one or more elements including these, which outputs the converted voltage Vin2 based on at least the input voltage Vin. The voltage conversion unit 42 may convert the input voltage Vin such that an output impedance of the energy harvesting electric power source 12 and an input impedance of the switching electric power source apparatus 20 have closer values than in a case where the input voltage Vin is inputted to the switch control circuit 70. The case where the input voltage Vin is inputted to the switch control circuit 70 refers to the input voltage Vin being directly inputted to the switch control circuit 70 with no intervention of a voltage conversion unit (for example, without the voltage conversion unit 42 being provided). The output impedance of the energy harvesting electric power source 12 and the input impedance of the switching electric power source apparatus 20 may be compared under a condition that the input voltage Vin is 0.5 V, may be compared under a condition that the input voltage Vin is 1 V, may be compared under a condition that the input voltage Vin is 1.5 V, may be compared under a condition that the input voltage Vin is 2 V, or may be compared under a condition that the input voltage Vin is other than these. The input voltage Vin is converted by the voltage conversion unit 42 into the converted voltage Vin2, to be outputted to the switch control circuit 70. A highly efficient electric power supply system can be realized by the voltage conversion unit 42 outputting the converted voltage Vin2 such that the output impedance of the energy harvesting electric power source 12 and the input impedance of the switching electric power source apparatus 20 have close values.

Figure 8:
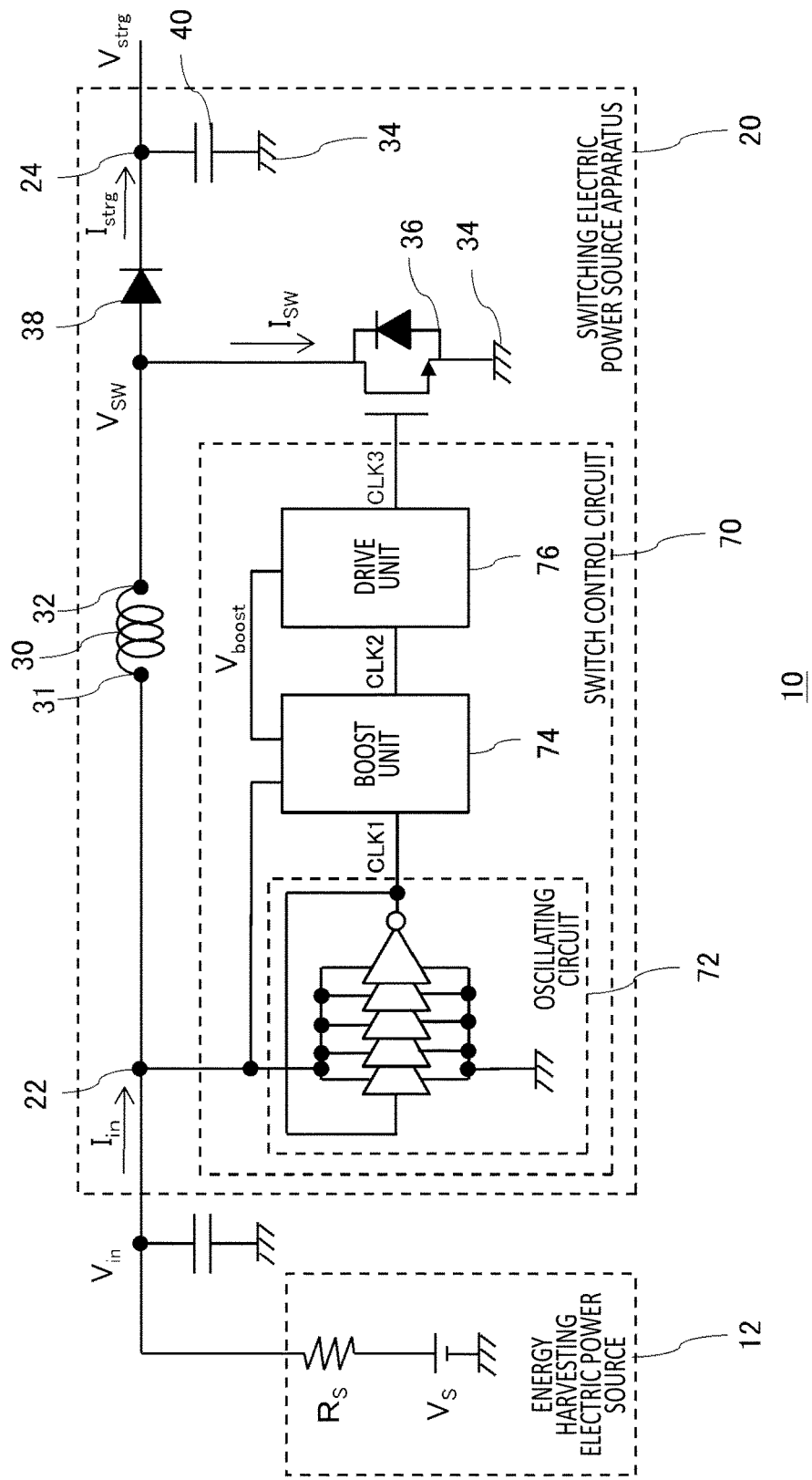
FIG. 8 shows a comparative example of an electric power supply system 10.

FIG. 8 shows a comparative example of an electric power supply system 10. The electric power supply system 10 in the comparative example is different from the electric power supply system 10 in FIG. 1 in that a voltage conversion unit 42 is not provided. Other configurations are similar to those of the electric power supply system 10 in FIG. 1.

Since the electric power supply system 10 in the comparative example does not include the voltage conversion unit 42, an input voltage Vin is directly inputted to a switch control circuit 70. In the electric power supply system 10 in the comparative example as well, a frequency of a drive signal CLK3 generated by the switch control circuit 70 increases as the input voltage Vin increases. Therefore, if the input voltage Vin increases, an average electric current flowing through a coil 30 also rapidly increases, and an input impedance of a switching electric power source apparatus 20 significantly decreases. This is convenient for an energy harvesting electric power source 12 in which an output impedance decreases as electric power increases due to increased illuminance, such as a solar cell, but for an energy harvesting electric power source 12 which rectifies radio waves and in which an output impedance does not change much, or for an energy harvesting electric power source 12 with an impedance significantly different from the input impedance of the switching electric power source apparatus 20, an impedance of the energy harvesting electric power source 12 and an impedance of the switching electric power source apparatus 20 will no longer match, resulting in a significant decrease in electric power transmission efficiency.

It is also conceivable to use a boost IC with a maximum power point tracking (MPPT) function as a means for matching impedances. However, the boost IC with the MPPT function consumes a large amount of electric power, and self-consumes output electric power. Therefore, in a low-power and unstable energy environment where input electric power temporarily decreases or disappears, a boosting operation cannot be effectively performed.

Figure 9:
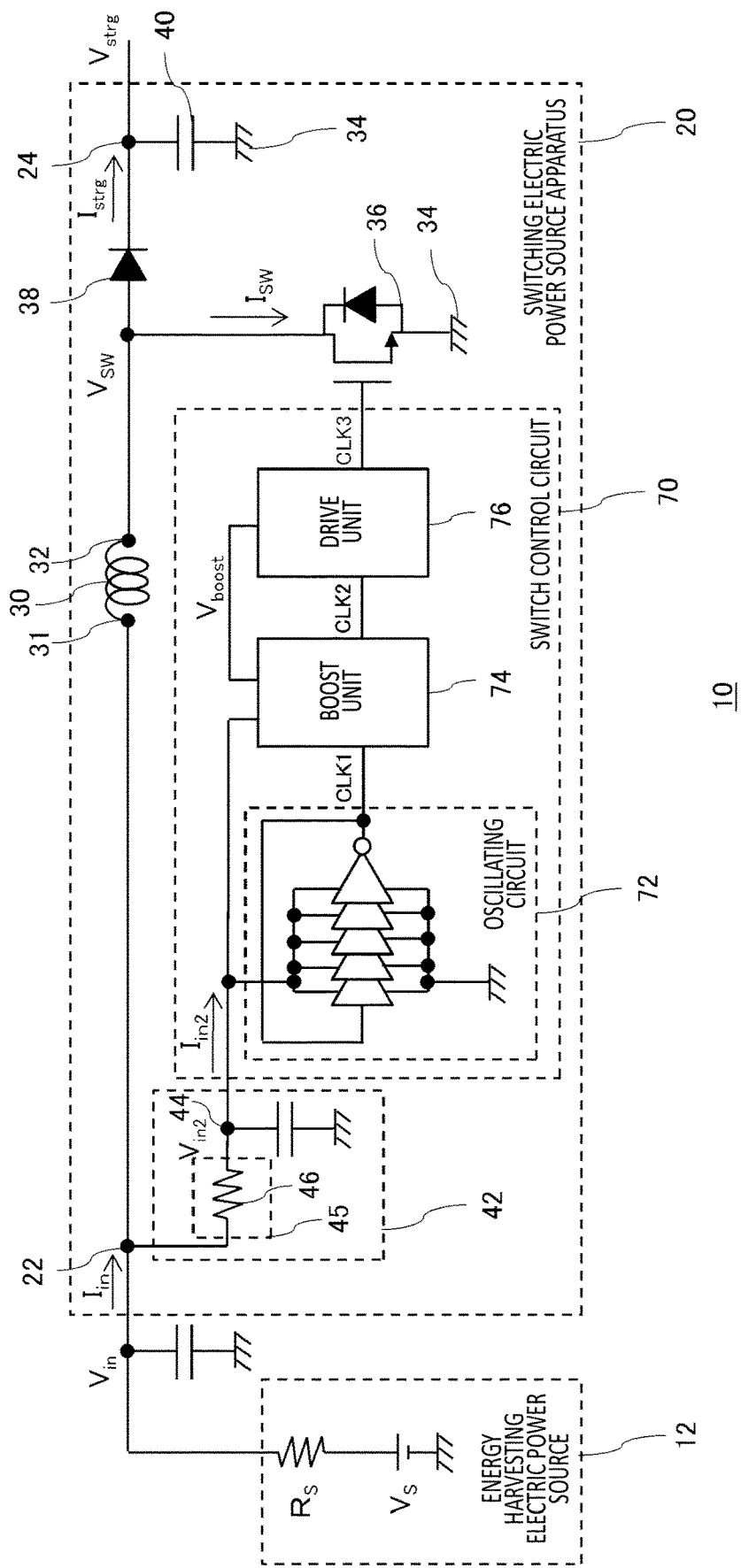
FIG. 9 shows a second embodiment example of the present invention in which a resistive element 46 is used as a voltage conversion unit 42.

FIG. 9 shows a second embodiment example of the present invention in which a resistive element 46 is used as a voltage conversion unit 42. The voltage conversion unit 42 may have: a converted voltage output terminal 44 which outputs a converted voltage Vin2; and a passive circuit 45 or an active circuit arranged between an input terminal 22 and the converted voltage output terminal 44. The passive circuit 45 in the present example has the resistive element 46 arranged between the input terminal 22 and the converted voltage output terminal 44. One end of the resistive element 46 may be coupled to the input terminal 22. Another end of the resistive element 46 may be coupled to the converted voltage output terminal 44. As the resistive element 46, a polysilicon resistor, a diffusion resistor, an nMOS, a pMOS, or the like built into an IC chip included in a switching electric power source apparatus 20 may be used. As the resistive element 46, a discrete resistive element may be used. The resistive elements 46 described above may be variable resistors. In addition, the resistive element 46 may be selected such that an output impedance of an energy harvesting electric power source 12 and an input impedance of the switching electric power source apparatus 20 have close values.

Since an electric current Iin2 flowing into a switch control circuit 70 increases as the converted voltage Vin2 increases, even if an input voltage Vin increases, the converted voltage Vin2 decreases by Rd×Iin2, preventing the converted voltage Vin2 from increasing. As a result, an increase in a frequency of a drive signal CLK3 generated by the switch control circuit 70 is suppressed, and a decrease in the input impedance of the switching electric power source apparatus 20 can be reduced.

Figure 10:
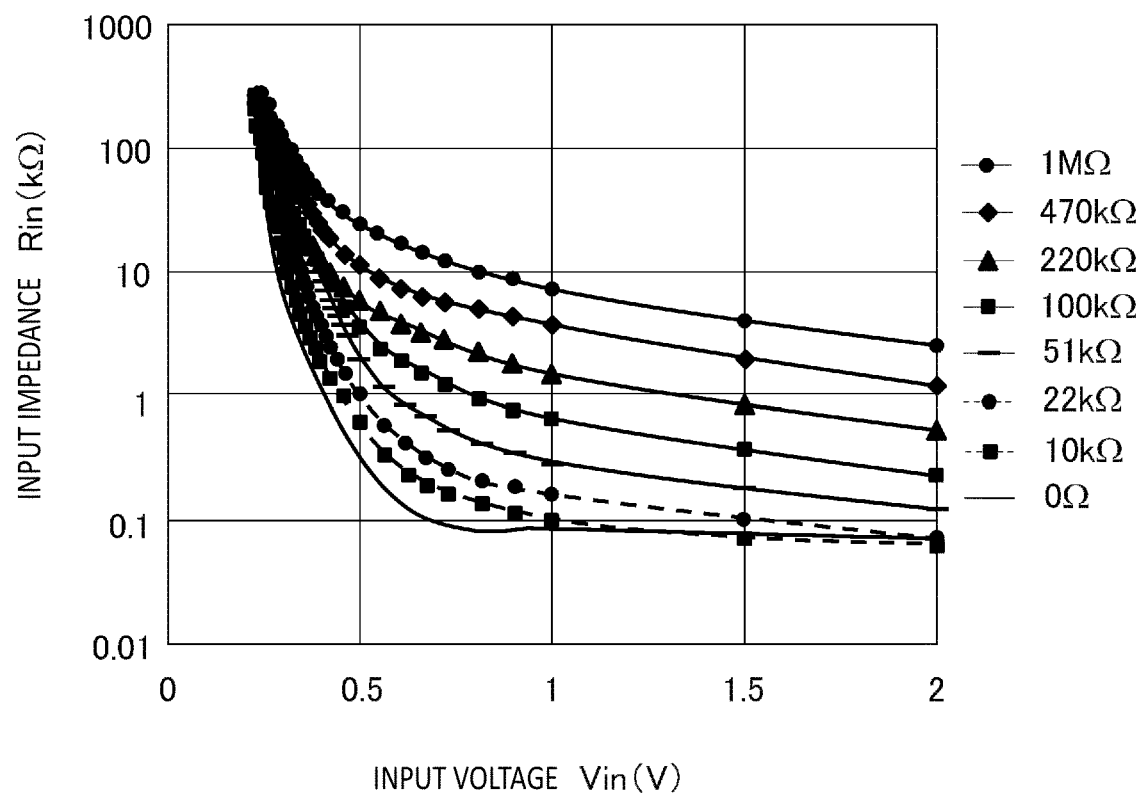
FIG. 10 shows relationships between an input voltage Vin and an input impedance Rin for when a value of the resistive element 46 is varied from 0 Ω to 1 MΩ.

FIG. 10 shows relationships between the input voltage Vin and an input impedance Rin for when a resistance value of the resistive element 46 is varied from 0Ω to 1 MΩ. The fact that the resistance value is 0 Ω refers to that the resistive element 46 is not provided. It is shown that the input impedance Rin can be set over a wide range by changing a value of the resistive element 46 used as the voltage conversion unit 42. The resistance value of the resistive element 46 may be 1 kΩ or greater and 10 MΩ or smaller, may be 10 kΩ or greater and 1 MΩ or smaller, or may be 100 kΩ or greater and 1 MΩ or smaller. It is known that the output impedance of the energy harvesting electric power source 12 takes a wide range of values from several tens of Ω to several tens of kΩ depending on its type, and use of the present embodiment example can realize a highly efficient boosting operation with an input impedance suitable for each energy harvesting electric power source 12. In addition, since the operation does not consume output electric power like an MPPT circuit, even in a low-power and unstable energy environment where input electric power temporarily decreases or disappears, an effective boosting operation can be performed without consuming electric power.

Figure 11:
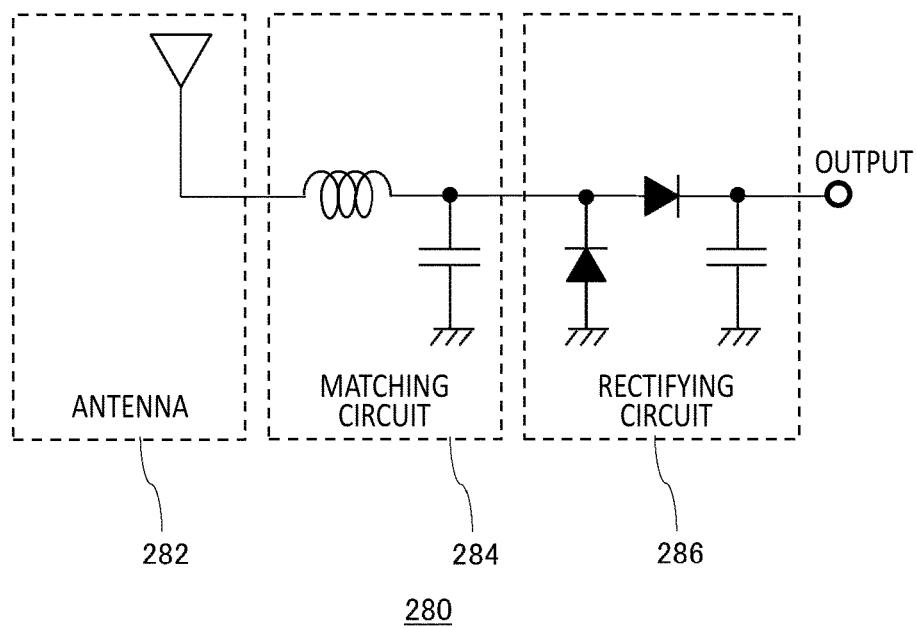
FIG. 11 shows a circuit example of a rectenna 280 which receives a 920 MHz microwave signal and converts it from AC to DC to obtain direct current electric power, as an example of an energy harvesting electric power source.

FIG. 11 shows a circuit example of a rectenna 280 which receives a 920 MHz microwave signal and converts it from AC to DC to obtain direct current electric power, as an example of an energy harvesting electric power source. The rectenna 280 in FIG. 11 includes an antenna 282, a matching circuit 284, and a rectifying circuit 286.

Figure 12:
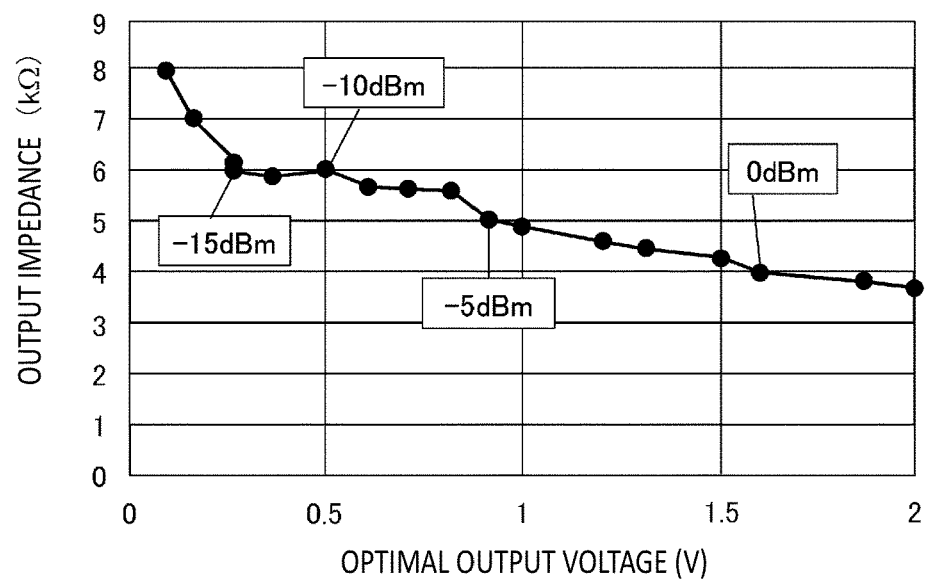
FIG. 12 shows a relationship between an output impedance of the rectenna 280 for when a microwave signal intensity is changed and an optimal output voltage at which output electric power is maximum at each microwave signal intensity.

FIG. 12 shows a relationship between an output impedance of the rectenna 280 for when a microwave signal intensity is changed and an optimal output voltage at which output electric power is maximum at each microwave signal intensity. The optimal output voltage increases as the inputted microwave signal intensity increases. When the optimal output voltage increases from about 0.1 V to about 2 V, an output resistance decreases from about 8 kΩ to about 4 kΩ.

According to the graph in FIG. 10, in a method in which the voltage conversion unit 42 is not provided (for example, the resistance value of the resistive element 46 is 0Ω), when the input voltage Vin increases to about 2 V, the input impedance Rin decreases to about 100Ω. Therefore, transmission efficiency becomes low for the rectenna 280. In contrast, selecting 470 kΩ as the resistance value of the resistive element 46 of the voltage conversion unit 42 can realize the input impedance of the switching electric power source apparatus 20 (about 1 kΩ to several kΩ) close to the output impedance of the rectenna 280, and can increase the transmission efficiency. In addition, the input impedance shown in FIG. 10 decreases as the voltage increases like the output impedance of the rectenna 280 in FIG. 12, and is suitable for obtaining high efficiency over a wider microwave input electric power range. When the energy harvesting electric power source 12 is an electric power source in which the output impedance decreases as an output voltage increases like the rectenna 280, the voltage conversion unit 42 may have the resistive element 46.

Figure 13:
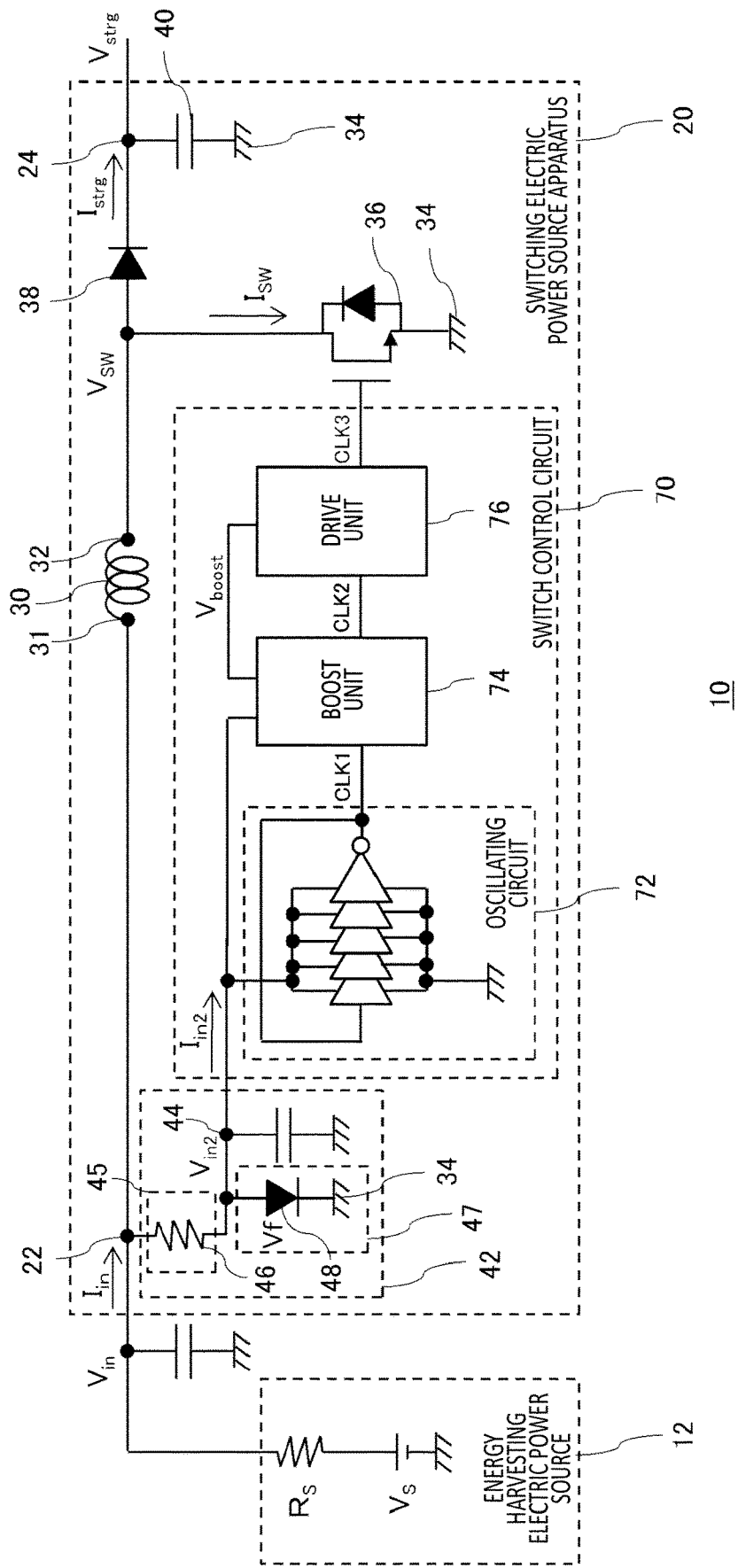
FIG. 13 shows a third embodiment example of the present invention in which a voltage limit circuit 47 is used as a voltage conversion unit 42.

FIG. 13 shows a third embodiment example of the present invention in which a voltage limit circuit 47 is used as a voltage conversion unit 42. The voltage conversion unit 42 may have the voltage limit circuit 47 which holds, when a converted voltage Vin2 has reached a determined threshold voltage, the converted voltage Vin2 at the threshold voltage. The voltage conversion unit 42 in the present example has a resistive element 46, which is an example of a passive circuit 45, and the voltage limit circuit 47. The voltage conversion unit 42 may have only the voltage limit circuit 47.

The voltage limit circuit 47 in the present example has a diode for voltage limiter 48 arranged in a forward direction from a converted voltage output terminal 44 toward a ground terminal 34. An anode terminal of the diode for voltage limiter 48 may be coupled to the converted voltage Vin2. A cathode terminal of the diode for voltage limiter 48 may be coupled to the ground terminal 34. Not limited to a diode, the voltage limit circuit 47 may have, for example, a passive circuit or an active circuit composed of a MOS, a bipolar transistor, a resistor, a capacitor, or the like, which causes, when the converted voltage Vin2 has reached the determined threshold voltage, an electric current to flow through the ground terminal 34 to hold the converted voltage Vin2 at the threshold voltage.

If a diode is used in the voltage limit circuit 47, the converted voltage Vin2 is limited to a forward voltage Vf of the diode, and thus dependency of an input impedance on an input voltage can be kept flatter than that in the graph shown in FIG. 10. As the diode for voltage limiter 48 used for a voltage limiter, a plurality of diodes coupled in series may be used. For example, a voltage limit value for a case where two diodes are coupled in series is 2×Vf.

Figure 14:
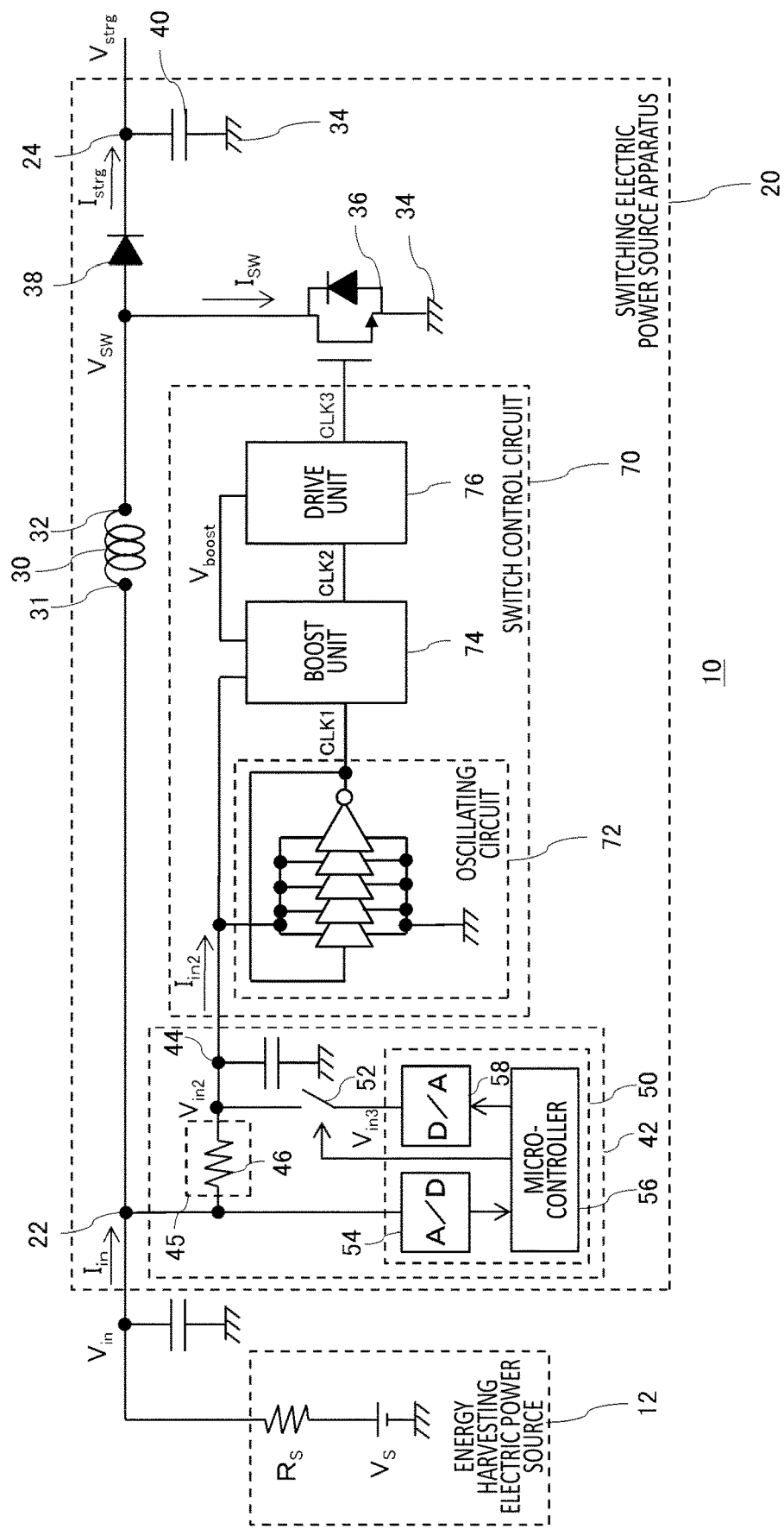
FIG. 14 shows a fourth embodiment example in which a switching electric power source apparatus 20 with an output enhancement function is provided.

FIG. 14 shows a fourth embodiment example in which a switching electric power source apparatus 20 with an output enhancement function is provided. A voltage conversion unit 42 in the present example has: a second conversion unit 50 which generates a second converted voltage Vin3 corresponding to an input voltage Vin; and a second switch 52 which switches between the second converted voltage Vin3 being applied to and being not applied to the converted voltage output terminal 44, in addition to a resistive element 46 and a converted voltage output terminal 44.

The second converted voltage Vin3 may be a voltage higher than a converted voltage Vin2 for a case where the second switch 52 is in an off state. The second conversion unit 50 may control the second switch 52 according to the input voltage Vin. Normally, the second switch 52 is off, and the switching electric power source apparatus 20 operates with an input impedance dependent on a value of the resistive element 46, as in the second embodiment example. The second conversion unit 50 may control the second switch 52 based on consumed electric power of a subsequent stage system to which electric power is supplied from the switching electric power source apparatus 20. For example, the switching electric power source apparatus 20 may control the second switch 52 to be in an on state when the consumed electric power of the subsequent stage system is equal to or greater than a predetermined threshold power. As a result, the second converted voltage Vin3 higher than the converted voltage Vin2 is applied to the switch control circuit 70, and greater electric power can be outputted to the subsequent stage system. The second converted voltage Vin3 may be a voltage smaller than the input voltage Vin. For example, the second converted voltage Vin3 may be a voltage between the input voltage Vin and the converted voltage Vin2, or may be a voltage higher than the input voltage Vin. The second conversion unit 50 may control the second switch 52 to be in the on state when the consumed electric power of the subsequent stage system is equal to or greater than the predetermined threshold power and output electric power from the switching electric power source apparatus 20 can be increased. It may be determined by the second conversion unit 50 whether the output electric power from the switching electric power source apparatus 20 can be increased, from at least one of magnitude of an input voltage Vin, magnitude of an input electric current Iin, or an output impedance Rs of an energy harvesting electric power source 12. The second conversion unit 50 may determine that the output electric power can be increased when at least one of the input voltage Vin or the input electric current Iin is equal to or greater than a predetermined threshold voltage or current. The second conversion unit 50 may determine that the output electric power can be increased when the output impedance Rs is equal to or smaller than a predetermined threshold impedance. As a result, a frequency of a drive signal outputted from the switch control circuit 70 increases, the input electric current Iin drawn by the switching electric power source apparatus 20 increases, and the output electric power can be increased.

The second conversion unit 50 may include an A/D converter 54, a microcontroller 56, and a D/A converter 58. The A/D converter 54 takes the input voltage Vin as an input, and the D/A converter 58 outputs the second converted voltage Vin3 to the converted voltage Vin2 through the second switch 52. The microcontroller 56 is coupled to an output of the A/D converter 54, and controls the D/A converter 58 and the second switch 52.

The microcontroller 56 turns on the second switch 52 based on results of a value of the input voltage Vin and a value of the input electric current Iin measured at the A/D converter 54, and drives the converted voltage Vin2 with an output of the D/A converter 58. The microcontroller 56 may turn on the second switch 52 when the value of the input voltage Vin is equal to or greater than the predetermined threshold value, or may turn on the second switch 52 when the value of the input electric current Iin is equal to or greater than the predetermined threshold value. The second converted voltage Vin3, which is an output voltage of the D/A converter 58, may be a voltage higher than the converted voltage Vin2 dependent on the resistive element 46 and the input voltage Vin.

Based on an output result of the A/D converter 54, the microcontroller 56 estimates magnitude of input electric power or/and an output impedance of the energy harvesting electric power source 12, and determines whether the output electric power can be increased. If the output electric power can be increased, the microcontroller 56 sets the D/A converter 58 to the second converted voltage Vin3, turns on the second switch 52, and increases the converted voltage Vin2 to a predetermined voltage. This increases a frequency of a drive signal CLK3, and increases the output electric power.

Figure 15:
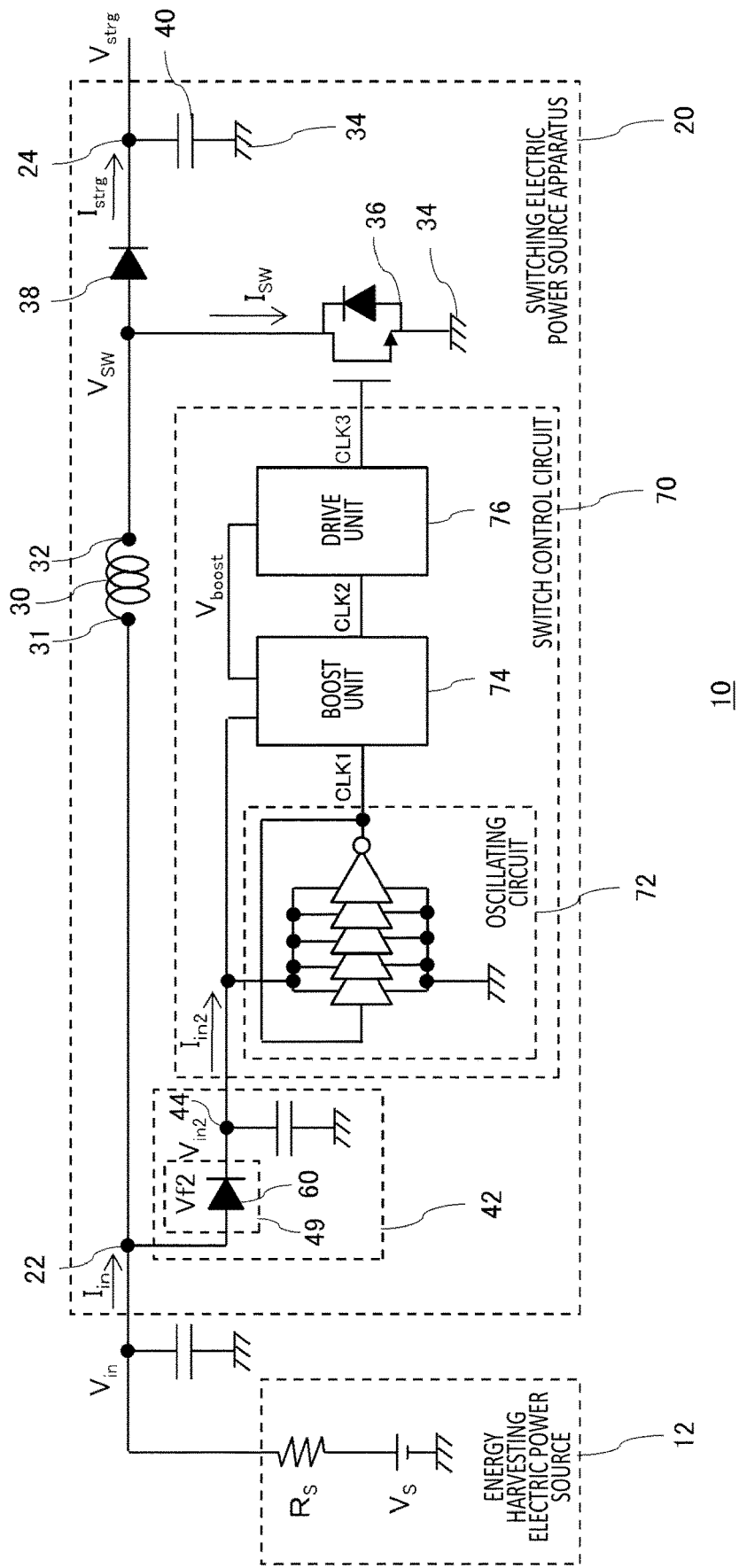
FIG. 15 shows a fifth embodiment example in which a diode for voltage conversion 60 is used as a voltage conversion unit 42.

FIG. 15 shows a fifth embodiment example in which a diode for voltage conversion 60 is used as a voltage conversion unit 42. The voltage conversion unit 42 in the present example has a converted voltage output terminal 44 which outputs a converted voltage Vin2, and an active circuit 49. The active circuit 49 in the present example has a diode for voltage conversion 60 arranged in a forward direction from an input terminal 22 toward the converted voltage output terminal 44. An anode terminal of the diode for voltage conversion 60 may be coupled to the input terminal 22. A cathode terminal of the diode for voltage conversion 60 may be coupled to the converted voltage output terminal 44. As the diode for voltage conversion 60, one or more diodes coupled in series and coupled in a forward direction between an input voltage Vin and the converted voltage Vin2 are used. Here, assuming that a forward voltage of the diode for voltage conversion 60 is Vf2, the input voltage Vin in the fifth embodiment example is expressed by the following expression.

(Expression 5)
$$Vin = Vf2 + Vin2 \qquad (5)$$

An optimal output voltage of a solar electric power generation cell is about 80% of an open voltage Vs, but a change in the open voltage Vs is smaller than a change in illuminance, and an electric current supply capability decreases at low power, and thus the input voltage Vin significantly decreases from an optimal point due to an input electric current Iin. For such a use application, if the fifth embodiment example is used in which the diode for voltage conversion 60 is used in the voltage conversion unit 42, an input impedance is automatically adjusted such that the input voltage Vin is as expressed by Expression 5, and since the forward voltage Vf2 of the diode changes little due to a change in an input electric current Iin2 to a switch control circuit 70, even if illuminance of light irradiated to the solar electric power generation cell decreases, it is possible to extract electric power with high efficiency down to low power without decreasing the input voltage Vin of a switching electric power source apparatus 20. When the energy harvesting electric power source 12 includes a solar cell, the voltage conversion unit 42 may include a diode for voltage conversion.

Figure 16:
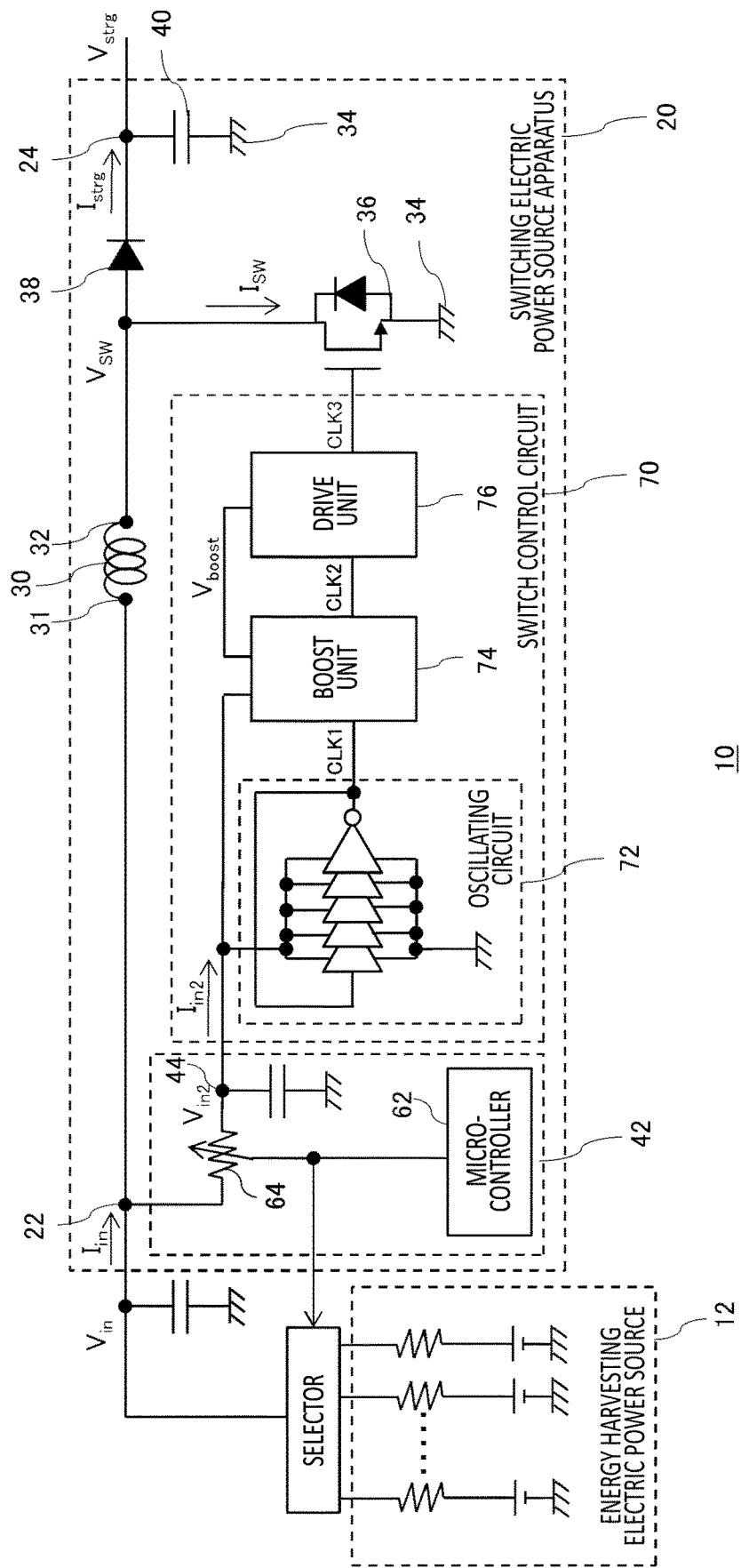
FIG. 16 shows a sixth embodiment example in which a variable resistor 64 and a microcontroller 62 are provided as a voltage conversion unit 42.

FIG. 16 shows a sixth embodiment example in which a variable resistor 64 and a microcontroller 62 are provided as a voltage conversion unit 42. The voltage conversion unit 42 in the present example has: a microcontroller 62; a converted voltage output terminal 44 which outputs a converted voltage Vin2; and the variable resistor 64 arranged between an input terminal 22 and the converted voltage output terminal 44. One end of the variable resistor 64 may be coupled to the input terminal 22. Another end of the variable resistor 64 may be coupled to the converted voltage output terminal 44.

The microcontroller 62 sets a resistance value of the variable resistor 64 based on an energy harvesting electric power source 12 which supplies an input voltage Vin to the input terminal 22. The microcontroller 62 may set the resistance value of the variable resistor 64 based on an output impedance of the energy harvesting electric power source 12. The microcontroller 62 may set the resistance value of the variable resistor 64 based on the energy harvesting electric power source 12 coupled to the input terminal 22. The resistance value may be set such that the output impedance of the energy harvesting electric power source 12 coupled to the input terminal 22 and an input impedance of a switching electric power source apparatus 20 have closer values than in a case where the input voltage Vin is inputted to a switch control circuit 70. As a result, impedances can be matched to various energy harvesting electric power sources 12 without changing a configuration of the voltage conversion unit 42.

An electric power supply system 10 in the sixth embodiment example may include a plurality of energy harvesting electric power sources 12. The microcontroller 62 may select the energy harvesting electric power source 12 which supplies the input voltage Vin to the input terminal 22 among the plurality of energy harvesting electric power sources 12, and set the resistance value of the variable resistor 64 based on the selected energy harvesting electric power source 12. The microcontroller 62 may select the energy harvesting electric power source 12 coupled to the input terminal 22 among the plurality of energy harvesting electric power sources 12, and set the resistance value of the variable resistor 64 based on the selected energy harvesting electric power source 12.

While the present invention has been described by way of the embodiments, the technical scope of the present invention is not limited to the above-described embodiments. It is apparent to persons skilled in the art that various alterations or improvements can be made to the above-described embodiments. It is also apparent from the description of the claims that embodiments added with such alterations or improvements can be included in the technical scope of the present invention.

EXPLANATION OF REFERENCES

10: electric power supply system, 12: energy harvesting electric power source, 20: switching electric power source apparatus, 22: input terminal, 24: output terminal, 30: coil, 31: first terminal, 32: second terminal, 34: ground terminal, 36: first switch, 38: diode, 40: capacitor, 42: voltage conversion unit, 44: converted voltage output terminal, 45: passive circuit, 46: resistive element, 47: voltage limit circuit, 48: diode for voltage limiter, 49: active circuit, 50: second conversion unit, 52: second switch, 54: A/D converter, 56: microcontroller, 58: D/A converter, 60: diode for voltage conversion, 62: microcontroller, 64: variable resistor, 70: switch control circuit, 72: oscillating circuit, 74: boost unit, 76: drive unit, 80: inverter, 82: pMOS switch, 84: nMOS switch, 86: charge pump, 88: conversion unit, 105: inverter, 110: inverter, 120: nMOS switch, 130: capacitor for boosting, 150: inverter, 155: inverter, 160: inverter, 170: MOS switch, 180: MOS switch, 190: MOS switch, 200: MOS switch, 210: MOS switch, 215: MOS switch, 220: MOS switch, 225: MOS switch, 230: MOS switch, 235: MOS switch, 240: inverter, 250: inverter, 260: resistor, 270: capacitor, 280: rectenna, 282: antenna, 284: matching circuit, 286: rectifying circuit.

What is claimed is:

1. An electric power supply system comprising: an energy harvesting electric power source; and a switching electric power source apparatus which boosts an input voltage supplied from the energy harvesting electric power source for an output, wherein the switching electric power source apparatus has:
an input terminal to which the input voltage is applied;
an output terminal from which a boosted voltage is outputted;
a coil having a first terminal and a second terminal, wherein the first terminal is coupled to the input terminal;
a first switch arranged between the second terminal of the coil and a ground terminal;
a diode arranged in a forward direction from the second terminal toward the output terminal;
a capacitor arranged between the output terminal and the ground terminal;
a voltage conversion unit which outputs a converted voltage that is based on the input voltage; and
a switch control circuit to which the converted voltage outputted from the voltage conversion unit is inputted and which outputs a drive signal having a frequency corresponding to the converted voltage and driving the first switch, wherein
the voltage conversion unit converts the input voltage such that an output impedance of the energy harvesting electric power source and an input impedance of the switching electric power source apparatus have closer values than in a case where the input voltage is inputted to the switch control circuit with no intervention of the voltage conversion unit.

2. The electric power supply system according to claim 1, wherein
the voltage conversion unit has:
a converted voltage output terminal which outputs the converted voltage; and
a passive circuit or an active circuit arranged between the input terminal and the converted voltage output terminal.

3. The electric power supply system according to claim 2, wherein
the passive circuit has a resistive element arranged between the input terminal and the converted voltage output terminal.

4. The electric power supply system according to claim 3, wherein
a resistance value of the resistive element is 1 kΩ or greater and 10 MΩ or smaller.

5. The electric power supply system according to claim 1, wherein
the voltage conversion unit further has a voltage limit circuit which holds, when the converted voltage has reached a determined threshold voltage, the converted voltage at the threshold voltage.

6. The electric power supply system according to claim 2, wherein
the voltage conversion unit further has a voltage limit circuit which holds, when the converted voltage has reached a determined threshold voltage, the converted voltage at the threshold voltage, wherein
the voltage limit circuit has a diode for voltage limiter arranged in a forward direction from the converted voltage output terminal toward the ground terminal.

7. The electric power supply system according to claim 2, wherein
the voltage conversion unit has:
a second conversion unit which generates a second converted voltage corresponding to the input voltage; and a second switch which switches between the second converted voltage being applied to and being not applied to the converted voltage output terminal, wherein the second converted voltage is a voltage higher than the converted voltage for a case where the second switch is in an off state.

8. The electric power supply system according to claim 7, wherein the second conversion unit controls the second switch according to the input voltage.

9. The electric power supply system according to claim 2, wherein the active circuit has a diode for voltage conversion arranged in a forward direction from the input terminal toward the converted voltage output terminal.

10. The electric power supply system according to claim 1, wherein the voltage conversion unit has:

a microcontroller;

a converted voltage output terminal which outputs the converted voltage; and a variable resistor arranged between the input terminal and the converted voltage output terminal, wherein the microcontroller sets a resistance value of the variable resistor based on the energy harvesting electric power source which supplies the input voltage to the input terminal.

11. The electric power supply system according to claim 10, wherein the electric power supply system includes a plurality of energy harvesting electric power sources including the energy harvesting electric power source, the microcontroller selects the energy harvesting electric power source which supplies the input voltage to the input terminal among the plurality of energy harvesting electric power sources, and sets the resistance value of the variable resistor based on the energy harvesting electric power source selected by the microcontroller.

12. A switching electric power source apparatus which boosts an input voltage supplied from an energy harvesting electric power source for an output, the switching electric power source apparatus comprising:

an input terminal to which the input voltage is applied;

an output terminal from which a boosted voltage is outputted;

a coil having a first terminal and a second terminal, wherein the first terminal is coupled to the input terminal;

a first switch arranged between the second terminal of the coil and a ground terminal;

a diode arranged in a forward direction from the second terminal toward the output terminal;

a capacitor arranged between the output terminal and the ground terminal;

a voltage conversion unit which outputs a converted voltage that is based on the input voltage; and a switch control circuit to which the converted voltage outputted from the voltage conversion unit is inputted and which outputs a drive signal having a frequency corresponding to the converted voltage and driving the first switch, wherein the voltage conversion unit converts the input voltage such that an output impedance of the energy harvesting electric power source and an input impedance of the switching electric power source apparatus have closer values than in a case where the input voltage is inputted to the switch control circuit with no intervention of the voltage conversion unit.

13. The electric power supply system according to claim 2, wherein the voltage conversion unit further has a voltage limit circuit which holds, when the converted voltage has reached a determined threshold voltage, the converted voltage at the threshold voltage.

14. The electric power supply system according to claim 3, wherein the voltage conversion unit further has a voltage limit circuit which holds, when the converted voltage has reached a determined threshold voltage, the converted voltage at the threshold voltage.

15. The electric power supply system according to claim 4, wherein the voltage conversion unit further has a voltage limit circuit which holds, when the converted voltage has reached a determined threshold voltage, the converted voltage at the threshold voltage.

16. The electric power supply system according to claim 3, wherein the voltage conversion unit further has a voltage limit circuit which holds, when the converted voltage has reached a determined threshold voltage, the converted voltage at the threshold voltage, wherein the voltage limit circuit has a diode for voltage limiter arranged in a forward direction from the converted voltage output terminal toward the ground terminal.

17. The electric power supply system according to claim 4, wherein the voltage conversion unit further has a voltage limit circuit which holds, when the converted voltage has reached a determined threshold voltage, the converted voltage at the threshold voltage, wherein the voltage limit circuit has a diode for voltage limiter arranged in a forward direction from the converted voltage output terminal toward the ground terminal.

18. The electric power supply system according to claim 3, wherein the voltage conversion unit has:

a second conversion unit which generates a second converted voltage corresponding to the input voltage; and a second switch which switches between the second converted voltage being applied to and being not applied to the converted voltage output terminal, wherein the second converted voltage is a voltage higher than the converted voltage for a case where the second switch is in an off state.

19. The electric power supply system according to claim 4, wherein the voltage conversion unit has:

a second conversion unit which generates a second converted voltage corresponding to the input voltage; and a second switch which switches between the second converted voltage being applied to and being not applied to the converted voltage output terminal, wherein the second converted voltage is a voltage higher than the converted voltage for a case where the second switch is in an off state.

* * * * *